(12) United States Patent
Jeong (10) Patent No.: US 6,724,579 B2
(45) Date of Patent: Apr. 20, 2004

(54) HEAD DRUM ASSEMBLY MOUNTING STRUCTURE ON A DECK OF A TAPE RECORDER

(75) Inventor: Yong-chae Jeong, Suwon (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 407 days.

(21) Appl. No.: 09/767,865

(22) Filed: Jan. 24, 2001

(65) Prior Publication Data

US 2001/0013995 A1 Aug. 16, 2001

(30) Foreign Application Priority Data

Jan. 24, 2000 (KR) .......................................... 2000/3254
Oct. 14, 2000 (KR) ........................................ 2000/60519

(51) Int. Cl.[7] .............................................. G11B 21/04
(52) U.S. Cl. .................. 360/271; 360/271.1; 360/271.5; 360/277.6
(58) Field of Search ........................... 360/271.1, 271.5, 360/271.6

(56) References Cited

U.S. PATENT DOCUMENTS 5,459,625 A * 10/1995 Ohshima et al. ....... 360/130.24
5,831,796 A * 11/1998 Nishida .................. 369/130.22
5,936,809 A * 8/1999 Nishida et al. .......... 360/271.1

* cited by examiner

Primary Examiner—A. J. Heinz
Assistant Examiner—Mark Blouin
(74) Attorney, Agent, or Firm—Robert E. Bushnell

(57) ABSTRACT

In a head drum assembly mounting structure on a deck of a tape recorder, a plurality of connecting holes and positioning holes are formed in a drum boss provided at a lower portion of a fixing drum, and a plurality of coupling holes and positioning pins are formed in a drum base which is slant disposed on a main base. By using the positioning holes and the positioning pins as positioning means which are connected to each other in complementary fashion, the coupling holes of the drum base and the connecting holes of the drum boss are aligned with each other, and by fastening a screw into such aligned coupling holes and the connecting holes, the head drum assembly can be directly coupled to the main base while being slant disposed with respect to the main base. Accordingly, any possible damage to a lead line is prevented, and assembly efficiency is improved, while the number of parts and the manufacturing cost are reduced.

40 Claims, 6 Drawing Sheets

HEAD DRUM ASSEMBLY MOUNTING STRUCTURE ON A DECK OF A TAPE RECORDER

CLAIM OF PRIORITY

This application makes reference to, incorporates the same herein, and claims all benefits accruing under 35 U.S.C. §119 from my application entitled HEAD DRUM ASSEMBLY OF A VCR filed with the Korean Industrial Property Office on Jan. 24, 2000 and there duly assigned Serial No. 2000/3254, and my application entitled HEAD DRUM ASSEMBLY MOUNTING STRUCTURE ON A DECK BASE OF A TAPE RECORDER filed with the Korean Industrial Property Office on Oct. 14, 2000 and there duly assigned Serial No. 2000/60519.

BACKGROUND OF THE INVENTION

1. Field of the Invention

The present invention relates to a head drum assembly, and more particularly to a head drum assembly mounting structure on a deck of a tape recorder.

2. Description of the Background Art

Generally, a tape recorder such as a camcorder, VCR, or the like has a fast rotating head drum assembly mounted on a main base of a deck. The head drum assembly includes a magnetic head which scans a traveling magnetic tape for information recording/reproducing.

Figure 1:
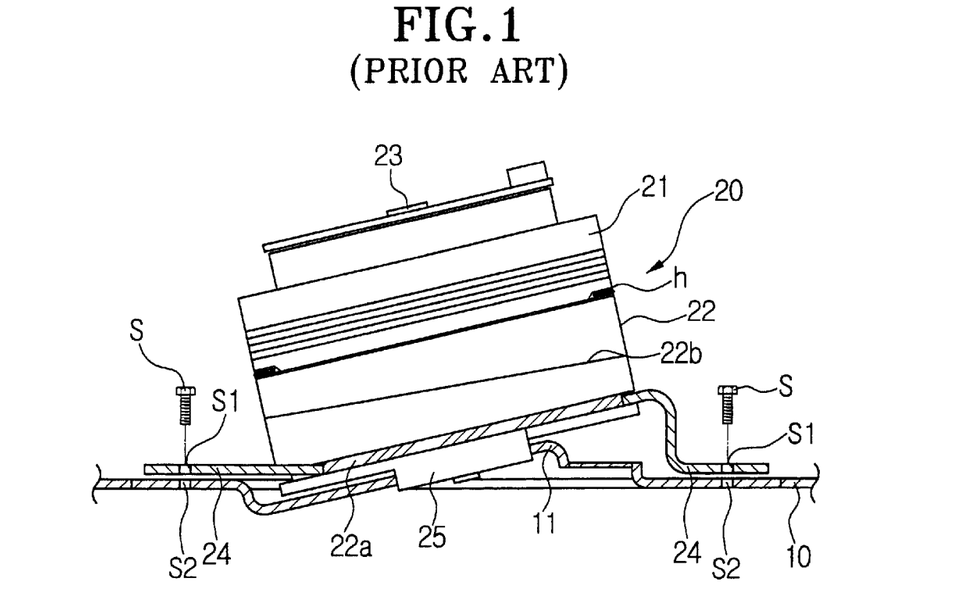
FIG. 1 is a schematic sectional view showing a head drum assembly mounting structure of a conventional tape recorder.

As shown in FIG. 1, a conventional head drum assembly 20 includes an upper drum 21 and a lower drum 22. The upper drum 21 and lower drum 22 are disposed on a same shaft 23 in such a manner that the upper drum 21 is rotatably supported by the shaft 23, and the lower drum 22 is fixed to the lower portion of the upper drum 21. The head drum assembly 20, constructed as above, usually employs a Helical scanning type in which the head drum assembly 20 is slanted on a predetermined slant with respect to the main base 10 of the deck to stably guide the running of the magnetic tape.

The Helical scanning type head drum assembly 20 includes a guide groove 22a formed on an outer circumference of a lower end of the lower drum 22. Ends of a plurality of brackets 24 are inserted in the guide groove 22a in such a manner as to be spaced from each other by a uniform distance. In this situation, the lower drum 22 and the other ends of the brackets 24 are mounted on the drum base 11 of the main base 10. The other ends of the brackets 24 are fastened to the drum base 11 by screws (S). A reference numeral 22b refers to a lead line, which is an outer circumference of the lower drum 22 stepped to guide the traveling of the magnetic tape. Also, reference numeral 25 is a drum boss received in a central opening of the drum base 11, and S1 refers to coupling holes formed in the brackets 24.

Figure 2:
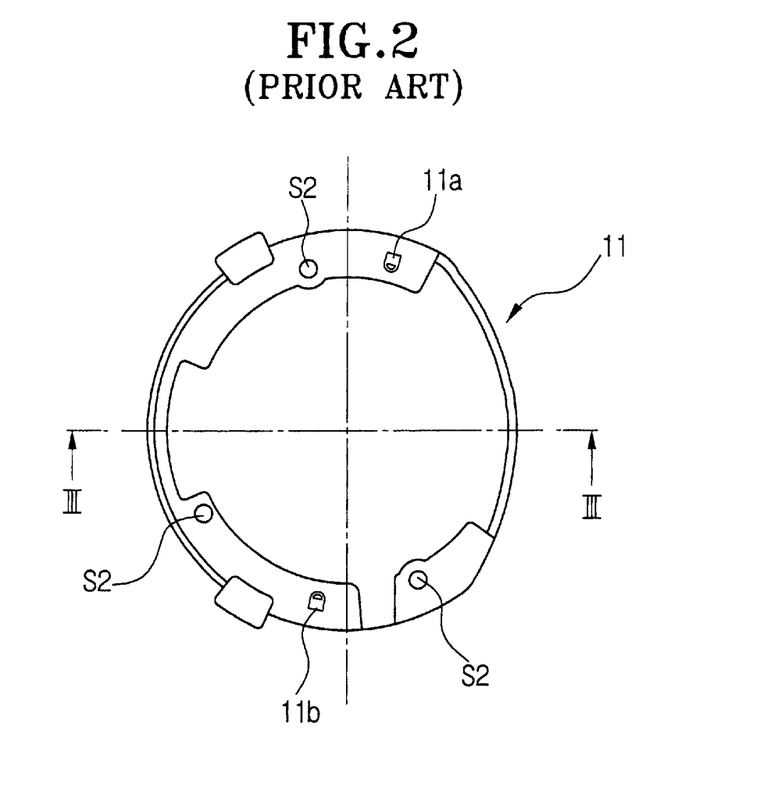
FIG. 2 is a schematic plan view showing a drum base of FIG. 1.

As shown in FIG. 2, the drum base 11 is a ring type rib, for example, having an opening formed in the center thereof, three screw coupling holes S2 formed therein at a uniform distance from each other, and a pair of positioning pins 11a and 11b.

Figure 3:
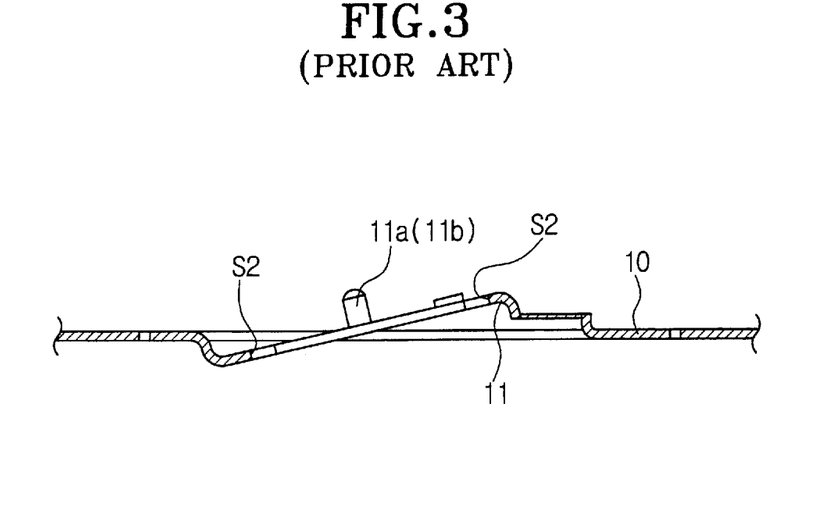
FIG. 3 is a schematic sectional view taken on line III—III of FIG. 2.

FIG. 3 is a sectional view taken on line III—III of FIG. 2. The drum base 11 is usually integrally formed with the main base 10 by proper processes such as a drawing, or the like, on a predetermined slant with respect to the main base 10.

The pair of positioning pins 11a and 11b stand substantially in a perpendicular relation with the slant plane of the drum base 11. The positioning pins 11a and 11b determine the mounting position and posture of the lower drum 22 which is mounted on the drum base 11, by a complementary connection with a positioning hole (not shown) formed in a lower surface of the drum boss 25. Accordingly, screw coupling holes (S1 and S2) of the drum base 11 and the brackets 24 are aligned with each other, permitting the screw (S) to pass therethrough and fasten.

In the conventional head drum assembly mounting structure, however, due to the fact that the brackets 24 press the lead line 22b while the drum base 11 and the brackets 24 are fastened by the screws (S), the lead line 22b of the lower drum 22 is often deformed.

Further, in order to insert one end of each of the brackets 24 to the lower drum 22, many processes are required, such as a process of processing the guide groove 22a for receiving the ends of the brackets 24, and also many parts are required, such as three brackets 24, the screw (S) and the pair of positioning pins 11a and 11b, or the like. Accordingly, due to deteriorated assembly efficiency and increased manufacturing cost, productivity is deteriorated.

SUMMARY OF THE INVENTION

The present invention has been developed to overcome the above-mentioned problems of the related art, and accordingly, it is an object of the present invention to provide a head drum assembly mounting structure on a deck base of a tape recorder capable of accomplishing cost effectiveness by decreasing the number of parts and improving assembly efficiency, and also establishing a quality stabilization by basically preventing any damage to the lead line of the lower drum during the assembly process.

The above object is accomplished by a head drum assembly mounting structure on a deck base of a tape recorder according to the present invention, including a head drum assembly which comprises: an upper drum, a lower drum, and a drum boss, all of which are connected to the same shaft; a drum base slanted on a main base of a deck; and a positioning and connecting means for determining a relative position of the drum base and the drum boss while complementarily connecting the drum base with the drum boss.

The positioning and connecting means includes: at least one positioning hole and at least one first coupling hole formed in a lower portion of the drum boss; a positioning pin formed on the drum base so as to be inserted into the positioning hole; and a second coupling hole formed in the drum base and corresponding to the first coupling hole for receiving a coupling member.

According to another aspect of the present invention, the positioning and connecting means comprise: at least one locking hole formed in a lower portion of the drum boss; and a hook pin formed on the drum base and corresponding to the locking hole for being complementarily connected with the locking hole.

The above object is also accomplished by a head drum assembly mounting structure on a deck base of a tape recorder according to another embodiment of the present invention, and including: a head drum assembly including an upper drum and a lower drum, both of which are connected to the same shaft; a slant boss formed on a lower portion of the lower drum for supporting the head drum assembly so as to be slanted with respect to a main base of a deck for surface-contact between the head drum assembly and the main base of the deck; and a connecting means for connecting the main base and the slant boss.

According to another aspect of the present invention, a positioning means is provided for determining a connecting position of the head drum assembly by a complementary connection between the main base and the lower drum. The positioning means includes: a plurality of positioning holes formed in the main base; and a plurality of guiding bosses protruding from a lower portion of the lower drum by different lengths, and corresponding to the plurality of positioning holes, so as to be inserted into and supported in the plurality of positioning holes.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

The present invention will now be described in greater detail with reference to the accompanying drawings.

Figure 4:
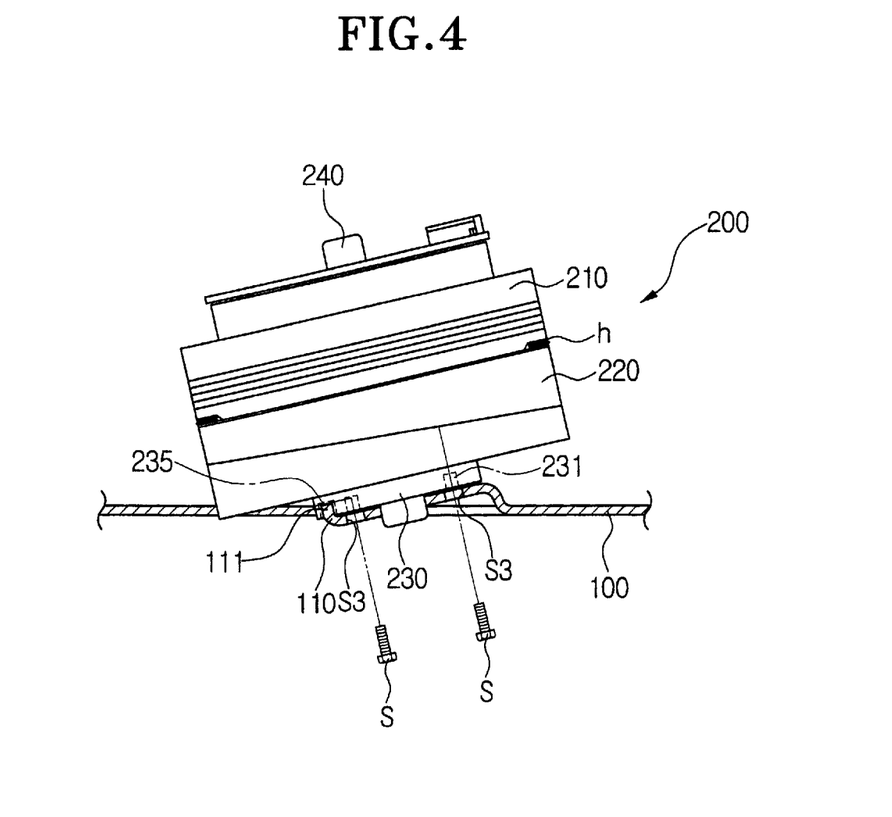
FIG. 4 is a schematic sectional view showing a head drum assembly mounting structure of a tape recorder according to a first preferred embodiment of the present invention.
Figure 5:
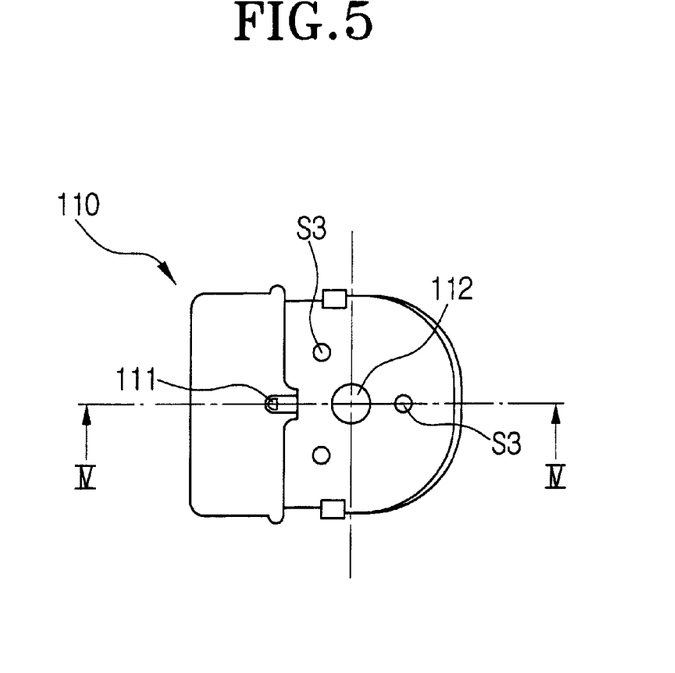
FIG. 5 is a schematic plan view showing a drum base of FIG. 4.
Figure 6:
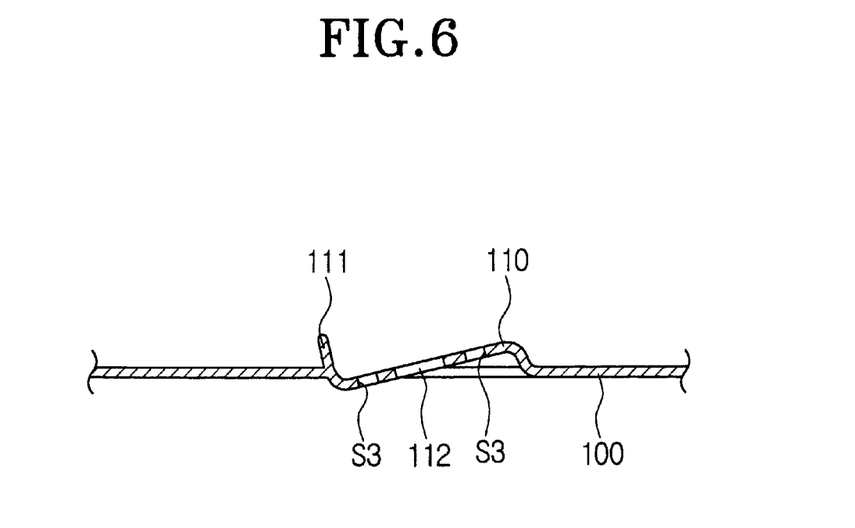
FIG. 6 is a schematic plan view taken on line VI—VI of FIG. 5.

As shown in FIGS. 4 through 6, in the head drum assembly mounting structure of a tape recorder according to the first preferred embodiment of the present invention, a drum boss 230 integrally formed with a lower portion of a lower drum 220 of a head drum assembly 200 is mounted on a drum base 110 and fastened by a screw. Here, the drum base 110 is integrally formed with a main base 100 while being slanted with respect to the main base 100.

The main aspect of the present invention is a positioning and connecting means, which is provided to position and connect the drum base 110 and the drum boss 230, for determining a relative connecting position of the drum base 110 and the drum boss 230 by a complementary connection.

The positioning and connecting means includes two or three first screw holes 231 formed in a lower portion of the drum boss 230, one positioning hole 235, two or three second screw holes S3 penetrated into the drum base 110 and corresponding to the first screw holes 231 for permitting the screws (S) to pass therethrough, and a positioning pin 111 formed on the drum base 110 and corresponding to the positioning hole 235. Throughout the description of the present invention, like elements are designated by the same reference numerals.

Meanwhile, according to another aspect of the present invention, an end of the shaft 240 protruding downward from the drum boss 230 also serves the function of the positioning and connecting means through cooperation with a shaft hole 112 (see FIG. 5) formed in the drum base 110. More specifically, when the drum boss 230 of the head drum assembly 200 is mounted on the drum base 110, the insertion of the lower end of the shaft 240 into the shaft hole 112 of the drum base 110 determines an initial connecting position.

When the drum boss 230 of the head drum assembly 200 is mounted on the drum base 110, in addition to the insertion of the lower end of the shaft 240 into the shaft hole 112 of the drum base 110, the positioning pin 111 is also inserted into the positioning hole 235, and accordingly, the first screw holes 231 and the second screw holes S3 are aligned with each other, permitting the screws (S) to pass therethrough and fasten. In order to accomplish such fastening of the screws (S), the relative positions of the positioning hole 235, the first screw holes 231, and the second screw holes S3 are determined in advance during processing.

Accordingly, by upwardly inserting, i.e., fastening the screw (s), into the first screw holes 231 formed on the lower portion of the drum base 110, the head drum assembly 200 is directly mounted on the drum base 110 of the main base 100.

Figure 7:
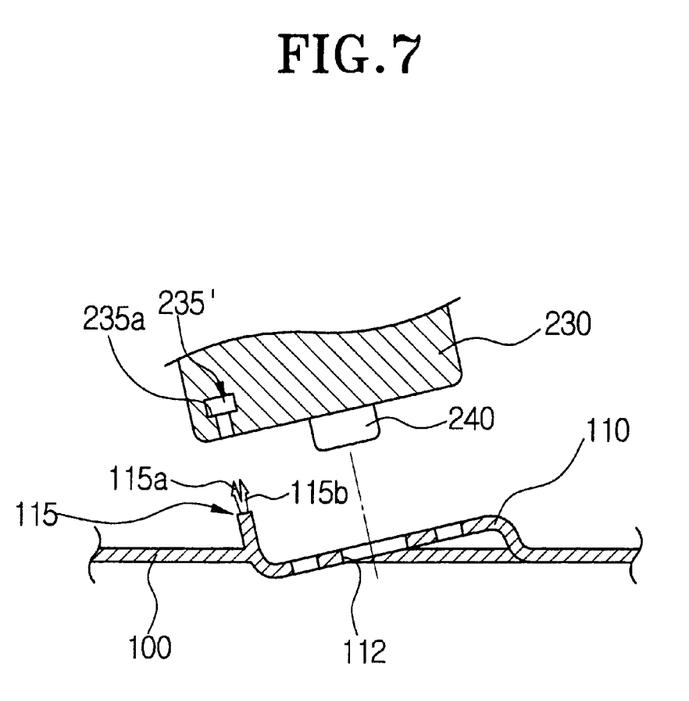
FIG. 7 is a sectional view showing a modified example of the main portion of the present invention.

FIG. 7 shows the positioning and connecting means of another preferred embodiment of the present invention. The positioning and connecting means includes at least one locking hole 235' formed in a lower portion of the drum boss 230, and a hook pin 115 formed on the drum base 110 corresponding to the locking hole 235' for a complementary connection with the locking hole 235'.

The hook pin 115 includes a pair of locking ends 115a and 115b branched from a leading end of the hook pin 115 and elastically biased in opposite directions, and a locking portion 235a extending from an inner circumference of the locking hole 235' so as to be locked with the pair of locking ends 115a and 115b.

When the hook pin 115 is inserted into the locking hole 235', the locking ends 115a and 115b of the hook pin 115 are pressed by the inner circumference of the locking hole 235' and advanced toward the locking portion 235a of the locking hole 235' until the locking ends 115a and 115b are biased outward and locked in the locking hole 235'.

As described, since the hook pin 115 can serve both as a positioning pin and as a screw, the initial connecting position of the drum boss 230 and the drum base 110 is determined, while the connection is made by one step during the connection of the drum boss 230 and the drum base 110.

Meanwhile, although the embodiments of the present invention depict the screws (S) and the screw holes S3 and 231, or the hook pin 115 and the locking hole 235', as the connecting means for connecting the drum boss 230 and the drum base 110, it should be noted that other proper types can also be applied without limitation.

Further, the position of the screws and the screw holes, and of the hook pin and the locking hole, are interchangeable. That is, the screws can be formed on a lower portion of the drum boss 230, while the corresponding screw holes are formed in the drum base 110. Likewise, the hook pin also can be formed on a lower portion of the drum boss 230, while the corresponding locking hole is formed in the drum base 110.

Figure 8:
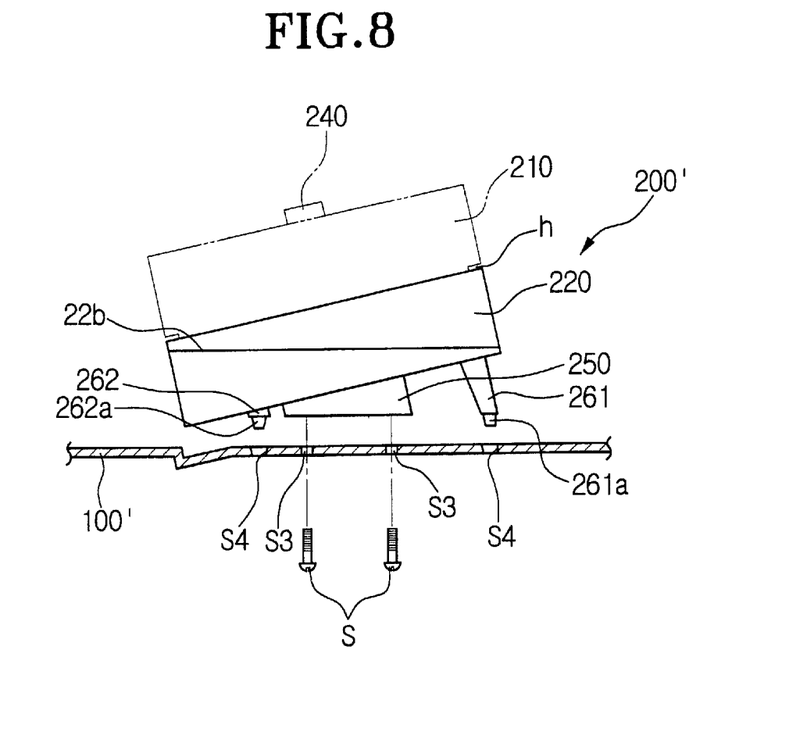
FIG. 8 is a schematic sectional view showing the head drum assembly mounting structure of a tape recorder according to a second preferred embodiment of the present invention.
Figure 9:
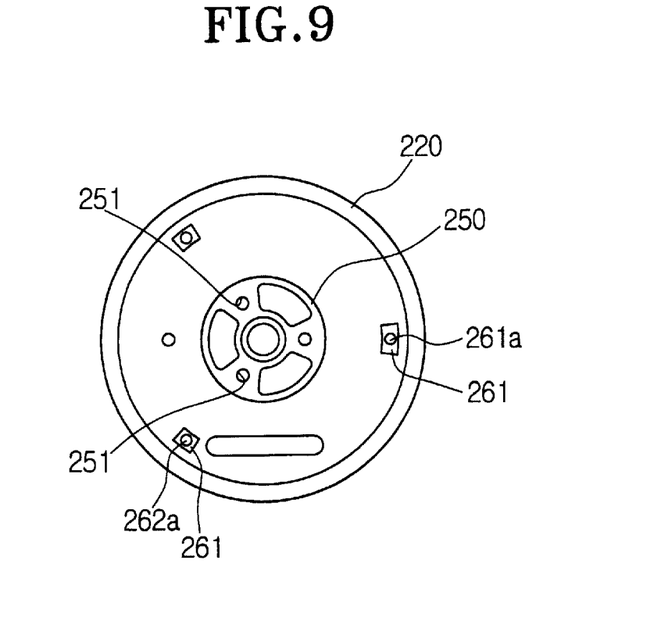
FIGS. 9 and 10 are, respectively, a bottom view and a perspective view of the lower drum of FIG. 8.
Figure 10:
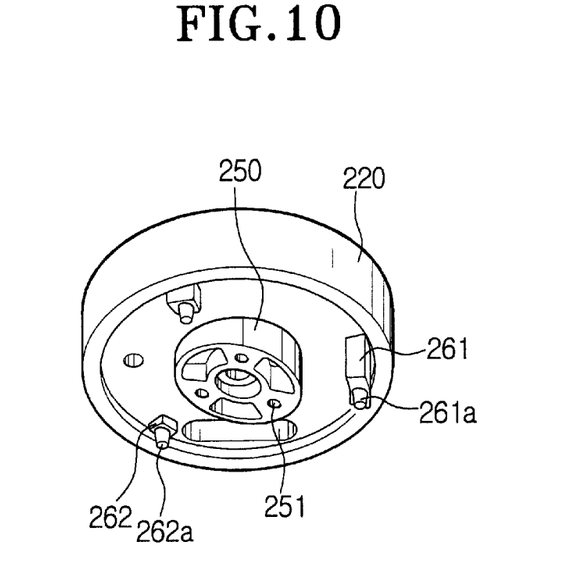

FIGS. 8 through 10 show a mounting structure of the head drum assembly according to a second preferred embodiment of the present invention. Throughout the description, like elements will be designated by the same reference numerals.

Referring to FIGS. 8 through 10, in the head drum assembly mounting structure according to the second preferred embodiment, a slant boss 250 integrally formed with a lower portion of the lower drum 220 is coupled with the main base 100'by surface-contact. Accordingly, the head drum assembly 200' is slant-supported on the main base 100'.

The main base 100' and the slant boss 250 include a plurality of connecting holes S3 and 251, respectively, corresponding to each other. By fastening a screws (S) into the connecting holes S3 and 251, the main base 100' and the slant boss 250 are coupled to each other.

A positioning means is provided for the main base 100' and the lower drum 220 so as to determine the mounting position of the head drum assembly 200' through a complementary connection.

It is preferable that the positioning means include a plurality of positioning holes S4 formed in the main base 100', and a plurality of guiding bosses 261 and 262 protruding from a lower portion of the lower drum 220 by different lengths for insertion into the positioning holes S4.

The guiding bosses 261 and 262 support the head drum assembly 200' on the main base 100' in a bridge pattern, while maintaining a predetermined slant of the head drum assembly 200' with respect to the main base 100'. As shown in FIGS. 9 and 10, different lengths of the guiding bosses 261 and 262 correspond to the varying length of the slant boss 250. The guiding bosses 261 and 262 includes positioning pins 261a and 262a protruding from the ends thereof. The positioning pins 261a and 262a serve as the positioning means by being inserted into the plurality of corresponding positioning holes (S4) formed in the main base 100'.

According to the above embodiment, the head drum assembly 200' is mounted on the main base 100' in such a state that the positioning pins 261a and 262a formed on the ends of the guiding bosses 261 and 262 are aligned with the positioning holes (S4) of the main base 100'. Here, the plurality of connecting holes S3 and 251 formed on the main base 100' and the slant boss 250 are also aligned with each other. In this situation, the screws (S) are fastened into the plurality of connecting holes S3 and 251 upwardly from the lower portion of the main base 100', and accordingly, the head drum assembly 200' is completely mounted.

According to another aspect of the present invention, the screws (S) can also be fastened into the plurality of connecting holes S3 and 251 in such a state that the head drum assembly 200' is turned upside down on a jig and the main base 100' is also turned upside down. Accordingly, the head drum assembly 200' mounting process becomes easier and simpler.

As described above, according to the head drum assembly mounting structure of the present invention, since the slant boss 250 is coupled to the main base 100' by screws (S) which are upwardly coupled from the lower portion of the main base 100', any possible damage to the lead line can be basically prevented.

Figure 11:
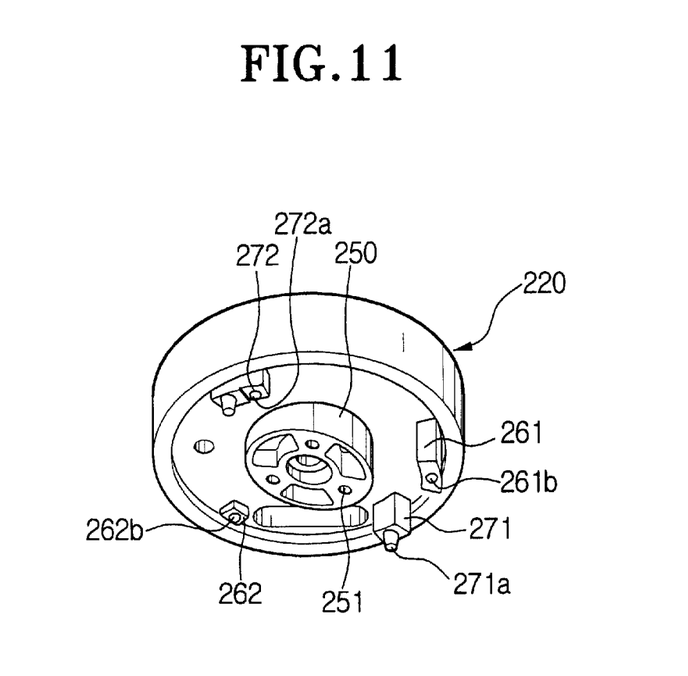
FIG. 11 is a schematic side elevation for explaining a modified example of the main portion of the present invention.

FIG. 11 shows a modified example of the positioning means for determining the mounting position of the head drum assembly 200'. According to this embodiment, additional positioning guides 271 and 272 are provided around the guiding bosses 261 and 262.

The positioning pins 271a and 272a on the ends of the positioning guides 271 and 272 are connected in the connecting holes (S3) of the main base 100'(FIG. 8). Here, the guiding bosses 261 and 262 include hemispheric protrusions 261b and 262b protruding from ends thereof. Accordingly, the guiding bosses 261 and 262 are supported on the main base 100' in such a manner that the hemispheric protrusions 261b and 262b are in contact with the main base 100'. As described, since the guiding bosses 261 and 262 are supported on the main base 100' by the point-contact of the hemispheric protrusions 261b and 262b with the main base 100', the contact area is decreased, and the influence of the evenness of the contact area is minimized. As a result, the head drum assembly can be stably assembled.

As described, according to the head drum assembly mounting structure of the tape recorder of the present invention, by means of the positioning means, the process of assembling the main base with the head drum assembly becomes simpler, and the productivity is increased. Further, by omission of parts such as screws, supporting brackets, or the like, the manufacturing cost can be reduced. Further, since the damage or deformation of the lead line can be prevented by the improved structure, reliable quality can be accomplished.

What is claimed is:

1. A head drum assembly mounting structure on a deck of a tape recorder, comprising:

a head drum assembly including an upper drum, a lower drum and a drum boss, all of which are connected on a same shaft;

a drum base; and fixing means for fixing said drum base to said drum boss;

wherein said drum base is formed with a main base into one piece.

2. A head drum assembly mounting structure of claim 1, further comprising:

positioning means for determining a relative position of said drum boss with said drum base.

3. A head drum assembly mounting structure of claim 2, wherein said positioning means comprises:

a cut out portion formed on said drum boss; and a protrusion formed on the drum base for insertion into said cut out portion.

4. A head drum assembly mounting structure of claim 3, wherein said cut out portion is a hole formed on said drum boss and said protrusion is a positioning pin formed on said drum base for insertion into said hole formed on said drum boss.

5. A head drum assembly mounting structure of claim 2, wherein said positioning means further comprises:

a protrusion formed on said drum boss for insertion into a cut out formed on said drum base for receiving said protrusion.

6. A head drum assembly mounting structure of claim 5, wherein said protrusion is a shaft.

7. A head drum assembly mounting structure of claim 2, wherein said positioning means comprises:

at least one locking hole formed in a lower portion of said drum boss; and a hook pin formed on said drum base and corresponding to said at least one locking hole for complementary connection with said at least one locking hole.

8. A head drum assembly mounting structure of claim 7, further comprising a pair of locking ends branched from a leading end of said hook pin and elastically biased in opposite directions, and a locking portion extending from an inner circumference of said at least one locking hole for locking with said pair of locking ends.

9. A head drum assembly mounting structure of claim 1, wherein said drum base is formed with at least one hole for receiving said fixing means, said at least one hole formed on said drum base corresponding to at least one hole formed on said drum boss.

10. A head drum assembly mounting structure of claim 1, wherein a radius of said drum boss is smaller than a radius of said lower drum.

11. A head drum assembly mounting structure of claim 1, wherein at least one hole is formed on said drum boss for receiving said fixing means.

12. A head drum assembly mounting structure of claim 11, wherein said drum base is formed with at least one hole for receiving said fixing means, said at least one hole formed on said drum boss and said at least one hole formed on said drum base being aligned with each other.

13. A head drum assembly mounting structure on a deck of a tape recorder, comprising:
   a head drum assembly including an upper drum, a lower drum and a drum boss, all of which are connected on a same shaft;
   a drum base;
   fixing means for fixing said drum base to said drum boss; and
   positioning means for determining a relative position of said drum boss with said drum base;
   wherein said positioning means comprises a cut out portion formed on said drum boss, and a protrusion formed on the drum base for insertion into said cut out portion; and
   wherein said cut out portion comprises at least one locking hole formed in a lower portion of said drum boss, and wherein said protrusion comprises a hook pin formed on said drum base and corresponding to said at least one locking hole for complementary connection with said at least one locking hole.

14. A head drum assembly mounting structure of claim 13, wherein said drum base is formed with at least one hole for receiving said fixing means, said at least one hole formed on said drum base corresponding to at least one hole formed on said drum boss.

15. A head drum assembly mounting structure of claim 13, wherein said drum base is formed with at least one hole for receiving said fixing means, said at least one hole formed on said drum base being aligned with at least one hole formed on said drum boss.

16. A head drum assembly mounting structure of claim 13, wherein said positioning means further comprises:
   a protrusion formed on the drum boss for insertion into a cut out formed on said drum base for receiving said protrusion.

17. A head drum assembly mounting structure of claim 16, wherein said protrusion is a shaft.

18. A head drum assembly mounting structure of claim 13, wherein said drum base is integrally formed with a main base.

19. A head drum assembly mounting structure of claim 13, further comprising a pair of locking ends branched from a leading end of said hook pin and elastically biased in opposite directions, and a locking portion extending from an inner circumference of said at least one locking hole for locking with said pair of locking ends.

20. A head drum assembly mounting structure of claim 13, wherein said drum base is slanted on a main boss of said deck.

21. A head drum assembly mounting structure of claim 13, wherein a radius of said drum boss is smaller than a radius of said lower drum.

22. A head drum assembly mounting structure on a deck of a tape recorder, comprising:
   a head drum assembly including an upper drum and a lower drum, both of which are connected on a same shaft;
   a drum base which is integrally formed on a main base;
   a slant boss formed on a lower portion of said lower drum for supporting said head drum assembly so that it is slanted with respect to said main base of said deck; and
   fixing means for fixing said drum base to said drum boss;
   wherein a radius of said slant boss is smaller than a radius of said lower drum and at least one hole is formed on said slant boss for receiving said fixing means.

23. A head drum assembly mounting structure of claim 22, further comprising:
   positioning means for determining a relative position of said slant boss with said drum base.

24. A head drum assembly mounting structure of claim 23, wherein said positioning means comprises:
   a cut out portion formed on said slant boss; and
   a protrusion formed on said drum base for insertion into said cut out portion.

25. A head drum assembly mounting structure of claim 24, wherein said cut out portion is a hole formed on said slant boss and said protrusion is a positioning pin formed on said drum base for insertion into said hole formed on said slant boss.

26. A head drum assembly mounting structure of claim 23, wherein said positioning means comprises:
   a protrusion formed on said slant boss for insertion into a cut out formed on said drum base for receiving said protrusion.

27. A head drum assembly mounting structure of claim 26, wherein said protrusion is a shaft.

28. A head drum assembly mounting structure of claim 23, wherein said positioning means comprises:
   a plurality of positioning holes formed in said drum base; and
   a plurality of protrusions extending from a lower portion of said lower drum by different lengths and corresponding to said plurality of positioning holes for insertion into said plurality of positioning holes.

29. A head drum assembly mounting structure of claim 22, wherein said drum base is formed with at least one hole for receiving said fixing means, said at least one hole formed on said drum base corresponding to at least one hole formed on said drum boss.

30. A head drum assembly mounting structure of claim 22, wherein said drum base is formed with at least one hole for receiving said fixing means, said at least one hole formed on said slant boss and said at least one hole formed on said drum base being aligned with each other.

31. A head drum assembly mounting structure on a deck of a tape recorder, comprising:
   a head drum assembly including an upper drum, a lower drum and a drum boss, all of which are connected on a same shaft;
   a drum base;
   fixing means for fixing said drum base to said drum boss; and
   positioning means for determining a relative position of said drum boss with said drum base;

wherein said positioning means comprises:
- at least one locking hole formed in a lower portion of said drum boss; and
- a hook pin formed on said drum base and corresponding to said at least one locking hole for complementary connection with said locking hole.

32. A head drum assembly mounting structure of claim 31, wherein said drum base is formed with at least one hole for receiving said fixing means, said at least one hole formed on said drum base corresponding to at least one hole formed on said drum boss.

33. A head drum assembly mounting structure of claim 31, wherein said drum base is formed with at least one hole for receiving said fixing means, said at least one hole formed on said drum base being aligned with at least one hole formed on said drum boss.

34. A head drum assembly mounting structure of claim 31, wherein said positioning means comprises:
- a cut out portion formed on said drum and
- a protrusion formed on said drum base for insertion into said cut out portion.

35. A head drum assembly mounting structure of claim 34, wherein said cut out portion is a hole formed on said drum boss and said protrusion is a positioning pin formed on said drum base for insertion into said hole formed on said drum boss.

36. A head drum assembly mounting structure of claim 31, wherein said positioning means further comprises:
- a protrusion formed on said drum boss for insertion into a cut out formed on said drum base for receiving said protrusion.

37. A head drum assembly mounting structure of claim 36, wherein said protrusion is a shaft.

38. A head drum assembly mounting structure of claim 31, wherein said drum base is integrally formed with a main base.

39. A head drum assembly mounting structure of claim 31, wherein a radius of said drum boss is smaller than a radius of said lower drum.

40. A head drum assembly mounting structure on a deck of a tape recorder, comprising:
- a head drum assembly including an upper drum, a lower drum and a drum boss, all of which are connected on a same shaft:
- a drum base;
- fixing means for fixing said drum base to said drum boss; and
- positioning means for determining a relative position of said drum boss with said drum base;
- wherein said positioning means comprises:
  - at least one locking hole formed in a lower portion of said drum boss; and
  - a hook pin formed on said drum base and corresponding to said at least one locking hole for complementary connection with said locking hole;
- said positioning means further comprising a pair of locking ends branched from a leading end of said hook pin and elastically biased in opposite directions, and a locking portion extending from an inner circumference of said at least one locking hole for locking with said pair of locking ends.

* * * * *